United States Patent

[11] 3,580,376

| [72] | Inventor | Richard C. Loshbough<br>Toledo, Ohio |
|---|---|---|
| [21] | Appl. No | 788,474 |
| [22] | Filed | Jan. 2, 1969 |
| [45] | Patented | May 25, 1971 |
| [73] | Assignee | Reliance Electric Company<br>Toledo, Ohio |

[54] ESCALATOR SYSTEM HAVING FAULT INDICATOR
8 Claims, 5 Drawing Figs.

[52] U.S. Cl. .................................................... 198/16,
198/232, 340/419
[51] Int. Cl. .................................................... B66b 9/12
[50] Field of Search .................................................... 198/16-
—18, 232, 37 (Cursory); 192/8; 340/419 188/Inquired

[56] References Cited
UNITED STATES PATENTS
2,629,486 2/1953 Eggleston et al.............. 198/232
2,686,585 8/1954 Margles et al. ............... 198/16
3,139,994 7/1964 Chasar ........................ 214/16.4(2)
3,343,158 9/1967 Tellerman .................... 340/419

*Primary Examiner*—Gerald M. Forlenza
*Assistant Examiner*—Frank E. Werner
*Attorney*—Wilson and Fraser ABSTRACT: An escalator system having a safety circuit to prevent operation under unsafe conditions and including a trouble indicator arranged to respond to any of a plurality of trouble-sensing switches in an escalator control circuit and structure. Two indicators are provided for each trouble condition, one which is actuated while trouble persists and the other is latched to retain an indication of trouble after the sensing circuit has been reestablished whereby an indication of a currently existing trouble condition is augmented by an indication of a previously existing trouble condition. Advantageously, the indicator can be connected and disconnected from the escalator system and is mounted in a portable case.

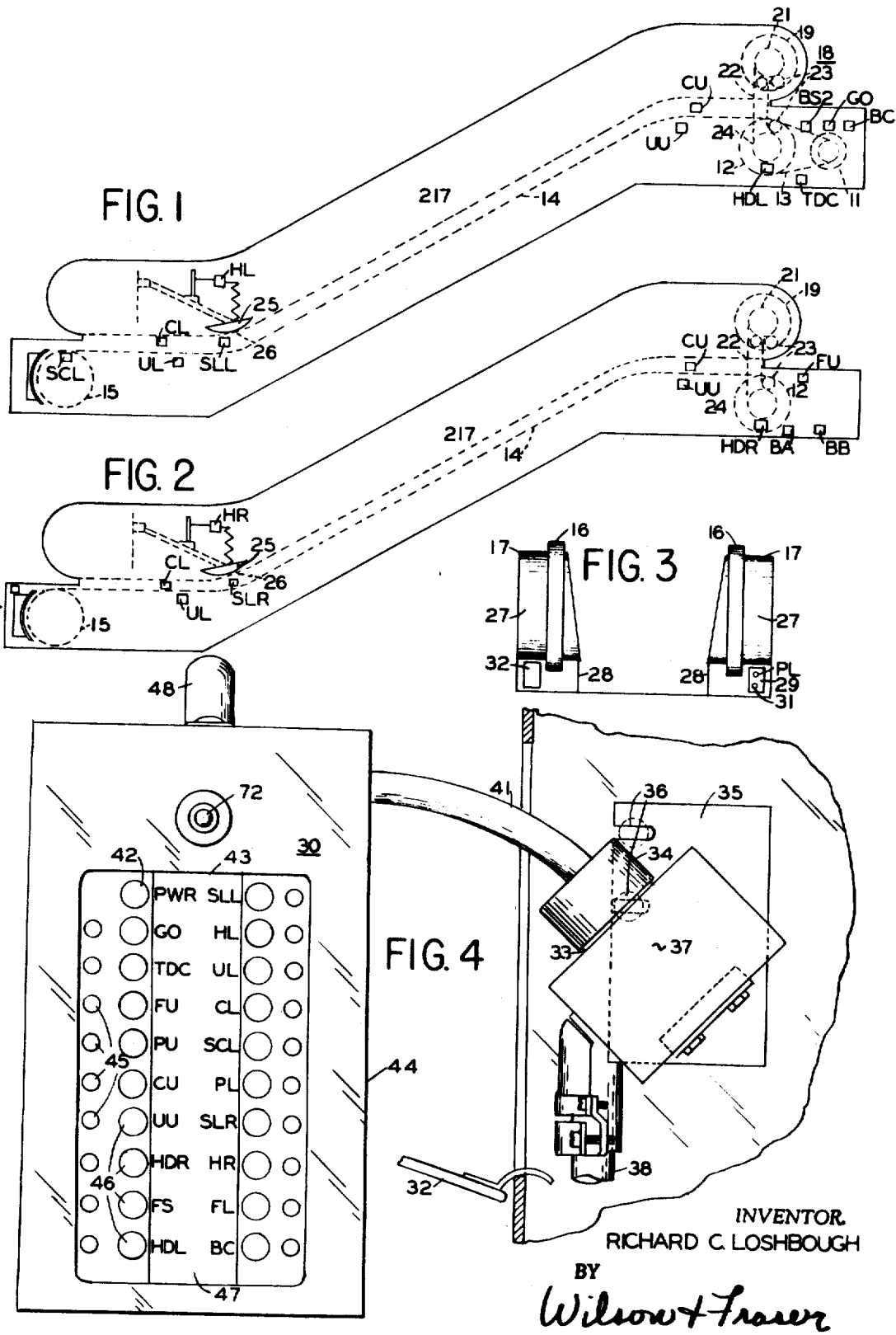

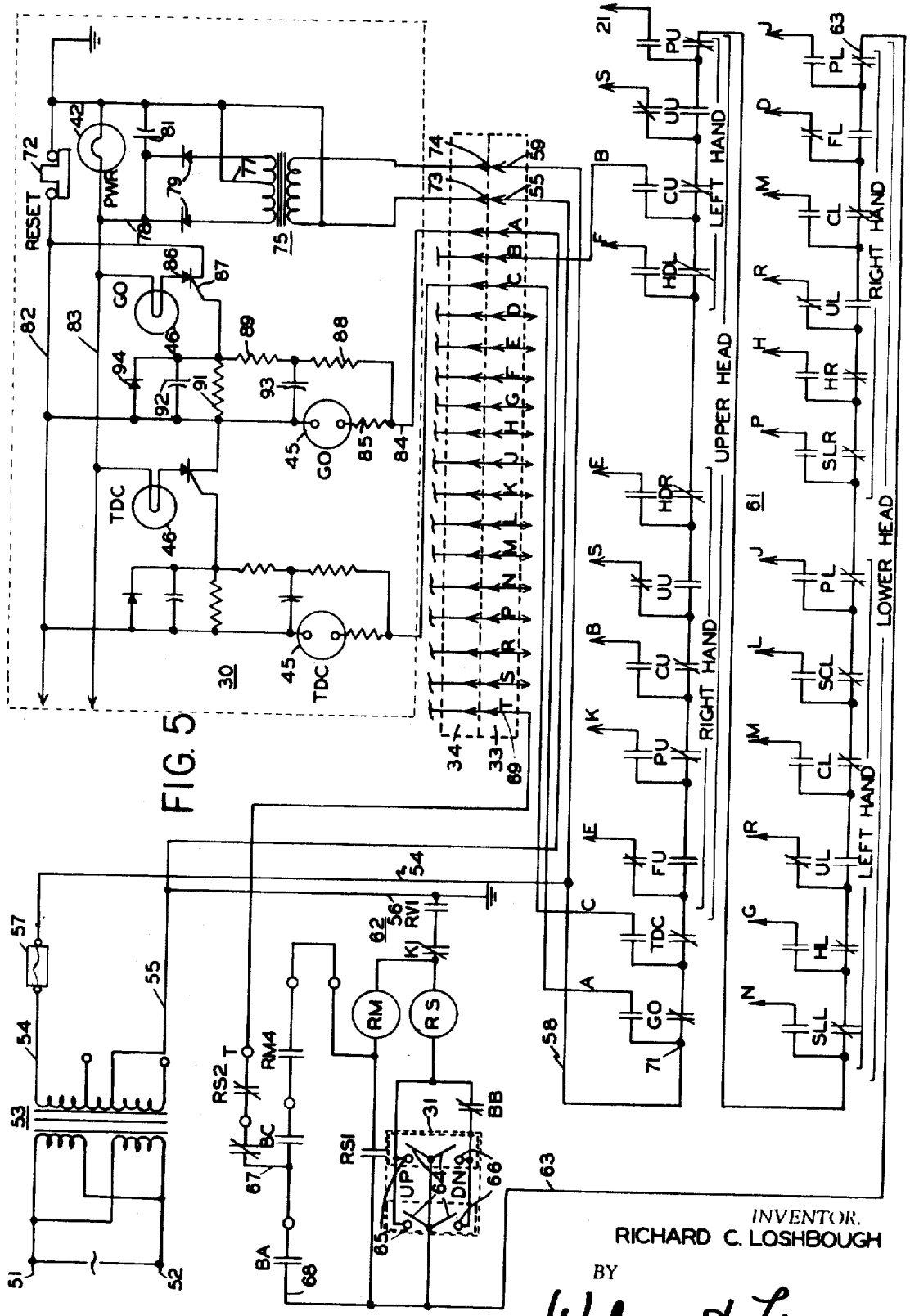

ESCALATOR SYSTEM HAVING FAULT INDICATOR

SUMMARY OF THE INVENTION

This invention relates to an escalator system and more particularly to a safety and testing means comprising a safety circuit to shut down the escalator for any of a plurality of malfunctions and an indicator means for identifying the malfunction or malfunctions. Each indicator means has memory means to retain a signal indicating a momentary malfunction as where a limit switch is tripped at a particular point in the travel of a step carriage and restored as the carriage travels beyond that point. Several indications of malfunctions can be accumulated in this manner to enable a serviceman to ascertain one or more problems in the system.

An object of this invention is to improve escalator systems.

Another object is to facilitate the servicing of escalator systems.

A further object is to monitor a plurality of safety mechanisms of an escalator for both intermittent and sustained operation and to indicate the individual malfunctions sensed by the mechanisms.

In accordance with the above, a feature of this invention involves a safety circuit made up of a plurality of switches arranged such that operation of any one switch actuates safety circuits which prevent continued unsafe operation. The safety circuit includes means responsive to individual safety switch operation to indicate the malfunction which occurred.

Another feature resides in providing circuitry to a releasable connection for a portable trouble indicator assembly including individual malfunction indicators and malfunction memories. The memories are controlled through controlled rectifiers to provide compact unitized circuits which can be packed in a convenient portable assembly with an indicator such as a neon lamp for a current malfunction and a storage indicator for a momentary malfunction. The storage indicator will retain its indication until reset as by manually depressing a switch-actuating button on the assembly.

DESCRIPTION OF THE DRAWINGS

The above and additional objects and features will be more fully appreciated from the following detailed description when read with reference to the accompanying drawings wherein:

FIGS. 1 and 2 are schematic diagrams of the elevation of the left side and right side respectively of an escalator system showing the general location of safety switches and major components of the system;

FIG. 3 is an end view of the lower head of an escalator showing the panel for access to the connection for a portable trouble indicator assembly;

FIG. 4 is a perspective of a portable trouble indicator assembly and its connection to the permanent escalator installation as at section 4—4 of FIG. 3; and FIG. 5 is a diagram of the system safety circuit, the connections to the indicator assembly and typical portions of the indicator assembly.

DESCRIPTION OF A PREFERRED EMBODIMENT

FIGS. 1 and 2 illustrate the left and right side of an escalator system and the location of the various safety devices. These devices in general are switches having a set of normally closed contacts and a set of normally open contacts, as will be more fully appreciated from the description of FIG. 5 which respond to various conditions by transfer of their contact states.

As in typical escalator systems, motor 11 drives step sprockets 12 through chains 13 whereby the chain of step carts (not shown) is caused to move along a step path 14 and around lower sprockets 15. Handrail 16 is guided along balustrade 17 and advanced in synchronism with the step carts by a drive 18 which may be in the form of a sprocket 19 where the handrail is of the type having chain links as shown in L. V. Cole U.S. Pat. No. 2,979,180 of Apr. 11, 1961 for "Hand Rail For Moving Stairs." Sprocket 19 is driven by sprocket 21 from chain 22 guided by idler sprockets 23 and driven by sprocket 24 coupled to their main step drive as at sprockets 12. A service brake is mounted on the shaft of motor 11 and is arranged for electromagnetic release (by means not shown) through energization of a brake solenoid. In view of the flexible coupling between motor 11 and main drive sprockets 12 an emergency brake (not shown) is provided on the drive sprockets. This emergency brake can be in the form of a drag clutch having one plate secured to sprocket 12 and a fractionally engaged second plate having a circular array of dogs (not shown) concentric with the sprockets 12. A pawl (not shown) is arranged to engage a dog of the emergency brake and is arranged for electromagnetic release prior to operation of the escalator.

The safety switches comprise a governor switch GO associated with the drive motor of the unit which is tripped upon an overspeed of the motor. An emergency brake pawl arm switch BA responds to a setting of the emergency brake (not shown) on the main drive sprocket 12 as where the drive chain 13 is broken and the dog (not shown) of the emergency brake is dropped into braking engagement. Since it is possible under certain conditions for the pawl to seat so firmly on a dog of the emergency brake that the release solenoid cannot fully retract the pawl, absence of complete release of the emergency brake pawl is indicated by a switch BB on the emergency brake pawl arm.

A normal stop of the moving stairway is by means of a service brake (not shown) which, when set actuates service brake arm switch BC in response to the setting motion of the arm (not shown) of the service brake. The drop of the solenoid which, when energized, releases the service brake, actuates service brake switch BS2 for a normal stop of the moving stairway.

Access to the operating mechanism located below the landings is through floor plates (not shown) to the pits (not shown) containing the drive and guiding mechanism for the steps and handrails. Safety interlock switches are responsive when the floor plates are not mounted and secured adequately as by lower landing floor plate switch FL and upper landing floor plate switch FU.

A failure or excessive slack in the various drive chains can be dangerous. Accordingly, switches which are responsive to these conditions are provided, including a triple drive chain slack switch TDC responsive to a slack condition in the drive chains 13 between the motor 11 and step sprocket drive. Each drive chain 22 between the step drive and the handrail drive has a switch responsive to a slack condition as left handrail drive chain switch HDL and right handrail drive chain switch HDR. Tension in the step chain is adjusted by horizontal displacement of a carriage supporting the lower sprocket 15 (by means not shown), and deviation from a preset range of tension in that step chain actuates step chain tension carriage switch SCL.

In operation, the condition of the steps and handrails is monitored to sense various malfunctions and respond thereto before hazardous conditions result. A loss of tension in either handrail is sensed as by left handrail tension switch HL and right handrail tension switch HR both of which respond to displacement of a shoe 25 which is biased downward at the lower light 26 of the return run of the handrail.

The step carts can be displaced from their intended paths or debris can bind them against cooperating elements of the system to create a potentially hazardous condition. At the landings, the step tread cleats (not shown) interdigitate with combplates (not shown). Foreign matter caught on the treads and carried into the combplates can bind the plates and cause their displacement transversely of the step path to trip combplate switches on either side of the combplate as those at the upper landing, switches CU, and at the lower landing, switches CL.

As adjacent step carts approach the landings, their treads rise along the riser of the next cart so that at the landing they are aligned horizontally. If a foreign object is engaged frictionally with the riser as where the toe of an overshoe is jammed against the riser, it can be carried between the tread and riser of adjacent steps with serious consequences. The riser side of the step carriage can be lifted from the track when such binding occurs to actuate an upthrust switch as lower landing upthrust device switch UL or upper landing upthrust device switch UU.

Transverse displacement of a step cart or the lodging of material along the side of the cart is sensed by displacement of the skirt panels along the step path as by left segment skirt switch SLL and right segment skirt switch SLR.

In FIG. 3 an end view of the lower head a moving stairway is shown including the newels 27 and portions of the skirts 28. Stop switch button PL is mounted in a plate 29 at the base of the newel with start switch 31, preferably of the key-operated type. Cover plate 32 in the base of the opposite newel covers a multiterminal receptacle 33 as shown in FIG. 4 arranged to receive a plug 34 for coupling a failure indicator unit 30 to the system so that the operating conditions of the several switches can be read and analyzed.

A mounting plate 35 secured to the inner face of the newel base as by screws 36, supports a receptacle box 37 from which suitable cabling 38 runs to the various switches as depicted in FIGS. 1, 2 and 3. Plug 34 is connected to cable 41 which extends to the failure indicator unit 30 including a pilot lamp 42 for indicating that power is available to the failure indicator unit 35 and the escalator system. A window 43 in the face of the box 44 containing unit 30 displays an array of indicator lamps which advantageously include paired neon and incandescent lamps 45 and 46 respectively each designated by an adjacent symbol corresponding to a safety switch displayed on the panel 47 centered between the paired columns of lamps. The box 44 is provided with a handle 48 to enable it to be transported conveniently and utilized as a service instrument with a plurality of moving stairways.

The safety circuit of a moving stairway, the safety switches, typical indicator circuits for the failure indicator unit as housed within box 44 and the plug 34 and jack 33 are represented schematically in FIG. 5.

The safety circuit located in the escalator controller is supplied from one phase of a three-phase, 220 volt, 60 cycle supply (not shown) on leads 51 and 52 through transformer 53 having parallel, split primaries for selection of the proper voltage windings and a secondary having several taps. Leads 54 and 55 supply the safety circuit start and run relays RS and RM which control the escalator motor (not shown) and the escalator brake solenoid (not shown). Lead 55 is grounded through lead 56. Lead 54 is connected through fuse 57 to lead 58 extending to receptacle 33 at jack 59 and to a series of safety switch contacts 61 corresponding to those switches discussed and thence to the control circuit 61 for relays RS and RM.

Each of the safety switch contact pairs is identified in circuit 61 with the symbol applied in FIGS. 1, 2 and 3. Each of these switches include a normally open and a normally closed contact pair arranged to have their states transferred to closed and open respectively in response to actuation by a malfunction or unsafe condition indicated to the condition-sensing means with which it is associated. It will be noted that the series safety switch circuit 61 includes both normally open and normally closed switch contact pairs. Normally closed switches GO, TDC, PU, CU, HDR, HDL, SLL, HL, CL, SCL, PL, SLR and HR are closed when it is safe to run indicating respectively: no overspeed of the motor (GO), no excessive slack in the drive chain (TDC), no operation of the upper newel stop button (PU), no displacement of the upper combplate (CU), no excessive slack in the right handrail drive chain (HDR), no excessive slack in the left handrail drive chain (HDL), no displacement of the left skirt adjacent the lower landing (SLL), proper tension in the left handrail (HL), no displacement of the lower combplate (CL); no displacement out of the acceptable range of the step chain tension carriage (SCL), no operation of the lower newel stop button (PL), no displacement of the right skirt adjacent the lower landing (SLR), and proper tension in the right handrail (HR). Normally open safety contacts FU, UU, UL and FL in series in safety switch circuit 61 must be closed to indicate respectively the upper floor plate is in position (FU), the upper and lower landing upthrust devices have not been tripped (UU and UL), and the lower floor plate is in position (FL). It will be noted that the safety switches for the upper head of the escalator are grouped in the series above those for the lower head of the escalator and further, that the switches in the right-hand portion of each head are grouped separately from those for left-hand portion, all as designated by the bracketed legends for circuit 61. In some instances safety switches are duplicated on the right-hand and left-hand sides of the heads of the escalator as PU, CU and UU in the upper head and UL, CL and PL in the lower head. In such instances, operation of either of the duplicated switches in response to a sensed malfunction will stop the escalator drive and set its brake while energizing an indicator unit terminal shared with its counterpart.

Lead 63 extends from the series of safety switches to a start and direction control switch 31 (also shown in FIG. 3) which is a double-pole double-throw switch biased to a normally open position so that in starting the escalator upward movable contacts 64 are engaged with poles 65 and when starting downward contacts 64 are engaged with poles 66. Switch 31 is ordinarily of the key-operated type. The escalator is started by turning the key to connect the switch for the desired drive direction and holding the switch until the start controls are set and movement of the escalator initiated. Thus for an ascending escalator, contacts 64 are engaged with poles 65 to energize star relay RS provided the circuit is completed to ground at lead 56 through overload relay back contacts K1 and reverse phase relay contacts RV1 of the overload and reverse phase relays respectively (not shown).

A down start is subject to an additional condition. The emergency brake pawl must be fully retracted from its dogs. As noted above, the pawl occasionally will hang up so that its solenoid is unable to retract it in the usual starting sequence. Under conditions of an attempt to retract the pawl and its hanging up, safety switch BB is actuated to open its back contacts BB in circuit with switch 31. This prevents damaging the system by attempting to divert against its energizing brake. Under these conditions the persons starting the escalator momentarily operates switch 31 for an up start. This causes movement of the dog to release the pawl as the escalator moves. Thereafter switch 31 is operated for a down start, the freed pawl is fully retracted by its solenoid, back contacts BB are therefore maintained closed and the escalator runs. When relay RS pulls in it closes contact RS1 to connect lead 63 to run relay RM which is also connected to ground lead 56 through contacts K1 of the overload relay and RV1 of the reverse phase relay. Back contacts RS2 in lead 67 open during starting of the escalator to avoid a false indication of operation of the service brake arm switch BC. In a normal start, key switch 31 is held closed until the escalator begins to move. At that time, the service brake has been released to actuate BC closing front contact BC in lead 68, and opening back contact BC in lead 67. Emergency brake pawl arm switch BA closes its contact in lead 68 if the pawl is fully retracted so that upon closure of contact RM4 in lead 68 a seal circuit is provided around contact RS1 for relay RM. Release of switch 31 at this time drops relay RS to open contact RS1, without effect, and closes back contact RS2 in lead 67. If the service brake has released, back contact BC in lead 67 is open and the closure of RS2 has no effect. If, on the other hand the service brake failed to fully release, back contact BC would remain closed and the closure of back contact RS2 would apply a signal on lead 67 to terminal T, thence jack 69 of female receptacle 33 from which it would actuate the failure indicator circuit for indicators BC as shown in FIG. 4.

Typical failure indicator circuits for indicators GO, the motor governor, and TDC, the triple drive chain slack switch TDC are shown for failure indicator unit 30. Each of the safety switch contact pairs in the series circuit 61 has a counterpart in a branched circuit having a junction with the series circuit immediately preceding the safety contacts of that switch. Thus junction 71 on the power supply side of governor switch safety back contacts GO extends a lead through governor switch safety front contacts GO to terminal A and thence to the receptacle 33. Each of the safety switch branch circuits is shown extending to a terminal having a letter designation A through H, J through N, or P through T with corresponding letter designation in receptacle 33 indicating the point of interconnection of the individual safety circuit branch or branches with a jack in the receptacle. It will be noted that all branch circuits are open when the respective monitored conditions are satisfactory for running the escalator and that any unsatisfactory condition is indicated by a closed branch circuit from lead 58 at the time its series circuit contacts are opened.

In case of a fault, the appropriate safety switch operates to open the series circuit 61, drop relay RM, and thereby stop the drive motor and set the brakes.

Correction of a fault is greatly facilitated by an immediate indication of the element which has malfunctioned. To the extent the safety switches indicate such element a failure indication is afforded by failure indicator unit 30. While a failure indicator unit can be integrated with the escalator controller, as a servicing instrument, its use is limited to occasions when service personnel are working on the system. Hence, it is advantageous to arrange the indicator in a portable form and provide convenient means to couple it to the system. In the illustrative embodiment, the failure indicator unit 30 is coupled to the escalator system by the insertion of plug 34 into receptacle 33 to connect energized lead 58 and ground 55 to the unit power supply and the safety circuit branches from circuit 61 to the individual indicator circuits for the safety switches. Brake switches BA and BC indicate a malfunction of the brake through indicator BC when an effort is made to run the escalator by operation of switch 31 whereby power is applied to lead 68 and thence to lead 67 and terminal T.

An indicator circuit is provided for each of jacks A through H, J through N, and P through T of the receptacle 33 as shown in FIG. 5. Only typical indicator circuits, typical connections to the receptacle 33, and typical connections from plug 34 to unit 30 are shown in FIG. 5. Thus, it is to be appreciated that the arrowheaded leads bearing single letter designations and branching from the safety switch circuit 61 are connected to arrowheaded leads having similar designations extending from receptacle 33. Similarly, the discontinuous leads from plug 34 extend to the AC signal inputs to the individual indicator circuits corresponding to the safety switch designations in safety switch circuit 61. The unidirectional power supply to these indicator circuits is shown with arrowheaded leads to signify that it is connected to the individual indicator circuits in the same manner as those illustrated.

Each indicator circuit includes a neon lamp 45 and an incandescent lamp 46 arranged so that the neon lamp is illuminated while power is supplied through the monitor circuit from the safeties and the incandescent lamp is illuminated continuously from the initiation of the neon illumination until the indicator is disconnected or reset by operation of reset button 72. Ground lead 55 is coupled to the indicator unit power supply at jack and plug 73 and the opposite side of the line 58 from transformer 53 is connected through lead 59 to jack and plug 74 whereby transformer 75 has its primary energized throughout the time plug 34 is inserted in receptacle 33 and power is available to the escalator system at leads 51 and 52. The availability of power is indicated by illumination of lamp 42 connected across the full wave rectifier circuit between transformer secondary center tap 77 and lead 78. Rectifiers 79 cooperate with capacitor 81 to provide a unidirectional source between grounded lead 82 and lead 83.

The basic indicator circuit is neon lamp 45 connected across an alternating current source from lead 58 to grounded lead 82 in the indicator unit 30 to indicate, when illuminated, the currently existing failure condition and a latch circuit for triggering and maintaining an incandescent lamp 46 illuminated even though the triggering condition has been terminated. The circuit for the governor safety is designated by GO adjacent lamps 45 and 42 and is connected through terminal A of the receptacle 33 and terminal A of the branch safety circuits to normally open contact GO such that an overspeeding of the motor closes contact GO and opens back contact GO to shut down the escalator motor 11 and set the escalator brake by dropping relay RM, and to apply alternating current to lead 84 through resistor 85 and neon lamp 45 to lead 82.

A silicon-controlled rectifier 86 provides the latching means for illumination of latching indicator, the incandescent lamp 46 located in its anode-cathode circuit connected across the leads 82 and 83 of the indicator unit unidirectional power supply. The gate 87 of the SCR is supplied with a positive signal from alternating current supplied lead 84 through the network comprising resistors 88, 89 and 91, capacitors 92 and 93, and rectifier 94. Rectifier 94 protects the SCR gate and the resistors and capacitors bypass spurious signals. Thus, as voltage is applied to lead 84 by the closure of the switch contact, it triggers SCR 86 through gate 87 whereby anode-cathode conduction is set up to illuminate lamp 46.

It is to be appreciated that a fault may be intermittent and thus extremely difficult to locate with ordinary servicing procedures. The present system responds to brief faults and retains an indication thereof by means of the latched indicator lamp 46. Further, multiple faults can be detected where a first fault is corrected or intermittent since the latched indication of the first fault is retained while another fault passes a signal to the indicator unit. For example, the system might experience a misalignment in a step tread with a combplate to actuate a combplate switch as at CL and a binding of the step to actuate upthrust device switch UL. This would open contact UL and back contact CL in circuit 61. With contact UL preceding contact CL; in order from the power supply at transformer 53, the closure of back contact UL to terminal R would apply an AC signal to the indicator circuit for UL illuminating its neon lamp 45 and incandescent lamp 46. The open contact UL interrupts the safety switch circuit 61 to those contacts and branches to its right in FIG. 5 whereby the signal is blocked from the branch to terminal M including closed contact CL. Upon correction of the step alignment so that the upthrust device at the lower landing is restored to its operating condition to permit contacts UL to close and back contacts UL to open to terminal R neon lamp 45 for UL is extinguished, incandescent lamp 46 for UL remains illuminated and the circuit 61 is completed from transformer 53 through contact UL to open back contact CL and the indicator branch to terminal M through closed contact CL. This operates neon lamp 45 for CL and incandescent lamp 46 for CL to provide indication of the second fault requiring correction. Alternatively, a service man can ascertain multiple faults by shunting the open contacts in safety circuit 61, after proper precautions to avoid aggravation of any unsafe condition, whereby the alternating signal is passed from transformer 53 to safety switches following the indicated switch to operate any indicator for an operated safety switch following the shunted switch. The latched incandescent lamps of those safety switches indicated to be operated thereby provide the service man with a complete picture of multiple faults even before correction of any fault is undertaken.

The latching indicator circuit can be reset for all such indicators by opening the lead 82 to ground. Normally closed button-actuated switch 72 provides the reset function since it terminates the anode-cathode current in the SCR's 86, thereby eliminating the current flow in lamp 42 until a gating signal is again applied to control electrode 87.

I claim:

1. An escalator system comprising an escalator, an electrical drive for said escalator; an electrically controlled brake for said escalator; means for sensing a malfunction in said system; means for disabling said drive and applying said brake in response to said sensing means; indicator means responsive to said sensing means while said sensing means responds to said malfunction; latching indicator means responsive to said sensing means and maintained responsive following the termination of response of said sensing means; and reset means for said latching indicator means.

2. A combination according to claim 1 including a second means for sensing a second malfunction in said system; a second means for disabling said drive and applying said brake in response to said sensing means; a second indicator means responsive to said second sensing means while said second sensing means responds to said second malfunction, and a second latching indicator means responsive to said second sensing means and maintained responsive following the termination of response of said second sensing means; said reset means resetting said first and second latched indicator means.

3. A combination according to claim 2 including portable means mounting said indicators and releasable means for connecting said indicators to said sensing means.

4. A combination according to claim 1 including a bistable trigger circuit responsive to said sensing means and operatively coupled to said latching indicator to maintain said latching indicator responsive following the termination of response of said sensing means.

5. A combination according to claim 1 wherein said indicator comprises a lamp and wherein said latching indicator comprises a lamp.

6. A combination according to claim 1 wherein said means responsive to said sensing means comprises, means responsive to an electrical signal for maintaining said drive in operation and said brake released while a signal is applied, a source of an electrical signal, a first switch to couple said source to said signal responsive means and which is transferred from a circuit-closing to a circuit-opening condition in response to a sensed malfunction, and a second switch to couple said source to said indicators which is transferred from a circuit-opening to a circuit-closing condition in response to a sensed malfunction.

7. A combination according to claim 6 including a source of direct current, a controlled rectifier having an anode, a cathode and control electrode, means connecting said anode, cathode and latching indicator including a unidirectionally conductive device across said source of direct current, and a network connected between said second switch and said control electrode to apply a signal to said controlled rectifier initiating anode-cathode conduction therein.

8. A combination according to claim 7 wherein said first-mentioned source supplies alternating current, and said first-mentioned indicator comprises a lamp across which said source is connected by said second switch, and wherein said network includes a unidirectionally conductive device to apply a unidirectional signal from said first-mentioned source to said control electrode.